July 17, 1973     A. J. REYNOLDS     3,746,604
FOAMED PLASTIC LAMINATE AND METHOD OF MAKING SAME
Filed May 21, 1971

INVENTOR.
ALEX J. REYNOLDS
BY Harry A. Herbert Jr
William J. O'Brien
ATTORNEYS

United States Patent Office

3,746,604
Patented July 17, 1973

3,746,604
FOAMED PLASTIC LAMINATE AND METHOD OF MAKING SAME
Alex J. Reynolds, 5 Center Terrace,
New Hartford, N.Y. 13413
Filed May 21, 1971, Ser. No. 145,654
Int. Cl. B32b 3/18, 3/26, 5/20
U.S. Cl. 161—69                                4 Claims

ABSTRACT OF THE DISCLOSURE

A technique for overcoming the delamination problems encountered during the use of laminated structures having a foamed plastic core. The natural adhesiveness existing between outer panel members and the foamed plastic inner core is enhanced by adhesively affixing a thin, continuous, convoluted ribbon of plastic to the interior surfaces of the outer panel members. The ribbon is affixed prior to the foaming reaction which produces the foamed inner core with the result that the core material bonds to the ribbon of plastic and the interior surfaces of the panel members to form an interlocking unitary structure.

BACKGROUND OF THE INVENTION

This invention relates to laminated panels and similar sandwich type structures. More particularly, this invention concerns itself with laminated structure which incorporate poured-in place foamed plastics as a low density filler or core material.

Foam cored laminates are well known and find wide application as structural elements, packaging materials and decorative pieces. They are especially useful in those areas where low density, high relative strength and high insulation properties are of importance. The fabrication of these structures is carried out by methods well known in the art. For example, the outer panel members, which maybe of metal or plastic, can be adhesively secured to both sides of a solid foamed core or, alternatively, the outer panel members can be placed in a suitable mold along with the core forming material which is then allowed to foam in place. A suitable foaming agent is incorporated in the foamable plastic and heated to effect the foaming reaction.

Suitable adhesives having properties that are not affected by the liquid core material or foaming reaction maybe applied to the inner surfaces of the outer panel members in order to provide permanent bonding to the inner core. Generally, adhesives are not required because of the natural adhesiveness existing between the foamed core and the outer panel members.

Although the methods relied upon heretofore have proven to be somewhat successful, the problem of delamination has not been overcome. Especially in those situations where complex curved sections and contoured structures are used. The inner surfaces of the outer panel sheets tend to peel away from the foamed core at points of stress.

With this invention, however, the problem of delamination has been overcome by a technique which involves the application of a continuous ribbon of plastic material to the inner surfaces of the outer panel members by the use of an adhesive. The ribbon is applied before the usual foaming reaction of the core material takes place. After foaming the ribbon provides a gripping surface between the outer panel members and the foamed inner core. As a result, delamination does not occur because of the positive bond between the foamed core and the outer panel sheets, even at points of stress. A further advantage of this technique is that it does not significantly increase the weight of the laminated structure. A fact of considerable importance in certain structural applications.

SUMMARY OF THE INVENTION

In accordance with this invention, it has been found that the peeling or delamination of the outer panel members of foam cored laminated structures can be abrogated by a technique which reinforces the natural adhesive action between the outer surfaces of the central core member and the inner surfaces of the outer panel members. In essence, the technique of the invention involves the application of a thin, continuous, convoluted ribbon of plastic to the inner surfaces of each of the outer panel members by means of an adhesive cement. The cement is characterized by properties that will not be affected by the foamable core material or the foaming reaction. The outer panel members are than placed in a suitable mold and the core area is filled with a foamable plastic that is allowed to foam in place. The convoluted ribbon provides a much needed gripping surface that supplements the adhesive action between the outer panel members and the inner core member.

Accordingly, the primary object of this invention is to provide a laminated panel structure that is not subject to the usual peeling or delamination of its outer panel members.

Another object of this invention is to provide a gripping existing between the outer panel members and the foamed inner core members of a laminated structure.

The above and still further objects and advantages of the present invention will become more readily apparent upon consideration of the following detailed description when taken in conjunction with the accompanying drawing. In the several views of the drawing, similar reference characters indicate the same or similar elements.

DESCRIPTION OF PREFERRED EMBODIMENTS

Pursuant to the above objects, the present invention contemplates a laminated structure having outer panel members and a plastic foamed-in-place core member. It also contemplates an improved technique for enhancing the natural adhesion between the foamed core member and to the outer panel members of the laminated structure. In carrying out the invention, it has been found that the application of a thin, continuous, convoluted ribbon of plastic to the inner surfaces of the outer panel member provides a gripping surface that improves the natural adhesion of the foamed core.

For optimum results the ribbon should be about 1/8 inch wide, or wider, and about 1/32 inch thick. Any plastic material that is not affected by the foaming reaction may be used. A polyethylene plastic ribbon will sustain the exothermic foaming reaction and has been found suitable. The convoluted ribbon is applied to the inner surface by means of any suitable cement, which is not affected by the subsequent foaming action. After applying the ribbon, the panel members are placed into a suitable mold which is then filled with a foamable material which is allowed to foam in place. After removal from the mold, the foam cored laminate is capable of use in various structural applications. It has special application as an insulation material in the fabrication of packages, containers and shelters for military use because of its low density and relatively high strength.

Figure 1:
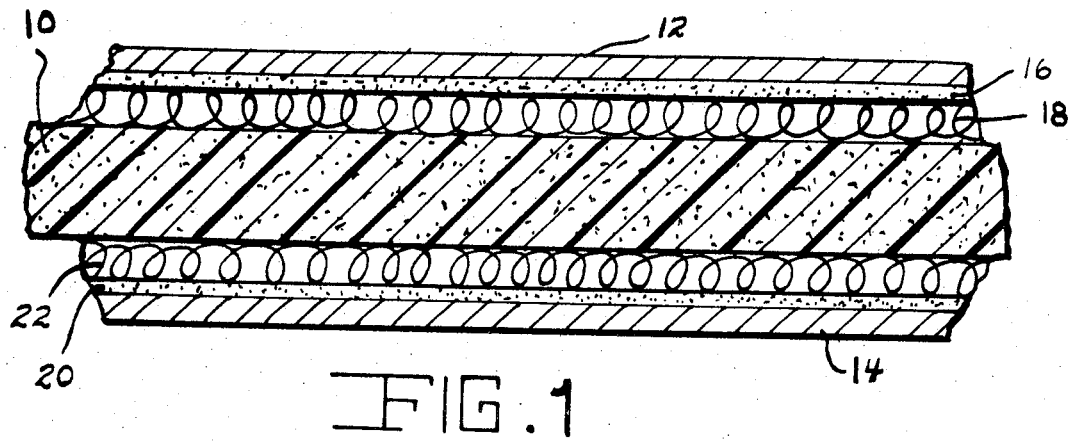
FIG. 1 represents a view in cross-section of a sandwich-type laminated structure prepared in accordance with this invention.

To further illustrate the invention reference is now made to the drawing which illustrate laminated structures of the type contemplated by this invention. In FIG. 1, the laminate includes outer panel members 12 and 14, a core or inner layer 10 of plastic foam, adhesive layers 16 and 20 and a convoluted ribbon of plastic 18 and 22 bonded respectively to the layers 16 and 20 and interlocked to the core 10. The panels 12 and 14 may be constructed of metal, wood, plywood, plastic, or combinations of such materials. Furthermore, one panel may be of metal and the other of a different material. Preferably, the panels 12 and 14 are sheets of metal, such as aluminum or aluminum alloys and it may be considered that the particular laminated structures illustrated in the drawings incorporates such sheets. In aircraft applications, the panels may be anodized. In any event, their inner surfaces are appropriately cleaned prior to assembling or fabricating the laminated structure. While we have shown the panels 12 and 14 are spaced parallel parts, it is to be understood that they may be in any selected or required relationship.

The inner layer or core 10 is formed in place and is in the nature of a body cellular plastic. It is preferred to employ a foamable plastic material having good physical strength characteristics such as alkyd resin-meta-toluene diisocyanate plastics or the foamable phenolic plastics. These and similar materials are made by preparing a reactant liquid or semi-liquid mixture which may be poured in place, applied by blades or trowels, or otherwise applied, and then allowed to react and foam up to constitute a cellular adherent mass that becomes rigid upon setting and curing.

Other foamable materials which have been found particularly useful in preparing the foam-cored laminates of this invention are the polyurethane foams. The production of these foams from polyols and polyisocyanates is well known in the art, for example, U.S. patents, 3,036,022; 3,060,137; 3,075,928; 3,087,901; and the publication "Polyurethanes," by Reinhold Publishing Corp., New York, at pp. 1-105 (1957) disclose suitable examples. By choosing suitable polyisocyanates and suitable polyols, according to the teachings of the prior art, soft and flexible, semi-rigid, or rigid foams can be obtained. Suitable polyisocyanates for this purpose include 2,4-tolylene diisocyanate, 2,6-tolylene diisocyanate, 4,4'-diphenylmethane diisocyanate, tolidene diisocyanate, hexamethylene diisocyanate, and other di- and higher polyisocyanates. In making the polyurethane foams, the polyisocyanates are reacted with polyol-like materials having two or more ative hydrogen atoms. For example, polyesters, polyester amides, polyalkylene glycols, polyoxyalkylated glycols, polyoxyalkylated amines, all of which are fully exemplified in the prior art cited may be utilized. Suitable polyesters are those prepared by conventional condensation reactions between dibasic acids and/or anhydrides with an excess of diols, triols and/or higher polyols. Dibasic acids and anhydrides, include but are not limited to, malonic, succinic, glutaric, adipic, pimelic, suberic, azeleic, sebacic, glutamic phthalic, isophthalic and terephthalic acids and succinic and phthalic anlydrides. Diols, triols and higher polyols include, but are not limited to, ethylene glycol, glycerol, trimethylol propane, 1,2,6-hexanetriol, trimethylol propane, and N,N.N'.N'-tetrakis(2-hydroxypropyl) ethylene diamine, all of which are also fully exemplified in the prior art cited. There also may be included catalysts such as tertiary amines, for example, N,N,N',N.-tetramethyl-1, 3-butane diamine, tetramethylguanidine, 1,4-diazabicyclo (2,2,2) octane and triethylamine. Stannous chloride can also be used. The catalysts are fully exemplified in the prior art. There may also be included polyols containing phosphorous in order to impart flame-resisting properties, for example, diethyl N,N. di-(2-hydroxyethyl) and aminomethyl phosphonate and like adducts of phosphoric acid. The blowing or foaming reaction can be effected by the blowing agents referred to above and, in addition, water, trichlorofluoromethane, methylene chloride, and the like may be utilized in accordance with practices well known in the art.

It is desirable to use a cellular material, such as those described above, that has a multiplicity of uniformly shaped spherical cells and one that is physically strong and of low density. These materials have the properties of adhering to other materials of practically all kinds and of retaining this adhesion although, as previously pointed out, the direct bonding or adhesion of these materials to metal is not as strong as desired for many applications.

It is to be understood that the panel members may be of any selected or desired thickness. In the drawings, the thickness of the panel members, adhesive, ribbon and core member has been exaggerated for the sake of clarity.

Any suitable chemical blowing agent, which will decompose upon heating to form a harmless gas, especially nitrogen, may be employed in making the device of this invention, examples being alpha, alpha'-azobisisobutyronitrile, diazoaminobenzene, dinitrosopentamethylenetetnamine, benzenesulfonephenylazide, etc. Selection of the particular blowing agent and the amount used to provide internal pressurization is adjusted in accordance with the predetermined size of the final structure.

Figure 2:
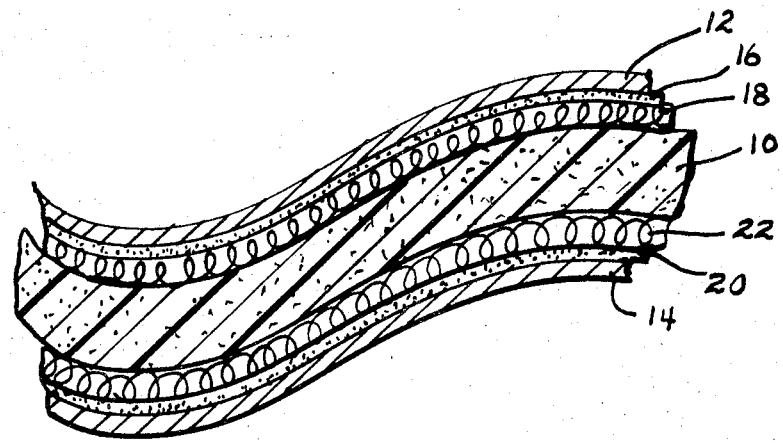
FIG. 2 represents a view in cross-section of a contour-shaped laminated structure prepared according to this invention.

An important feature of the invention is the adaptability of the process in producing irregular or contour shaped foam-cored laminates. A typical cross section of a contour shaped foam-cored laminate is shown in FIG. 2.

The plastic ribbon 18 or 22, preferably of polyethylene, may be suitably bonded to the panel members with an epoxy resin adhesive hardenable at ambient or moderately elevated temperatures and under only sufficient pressure to assure firm contact between the panel members 12 and 14 and the core 10 during the foaming reaction period. Suitable adhesives are the liquid, partially polymerized, high molecular weight reaction products of a diphenol and an epoxy compound. One example of such a reaction product is that obtained by heating together 2,2'-bis(4-hydroxyphenyl propane) and epichlorhydrin in the presence of an alkali such as sodium hydroxide. This forms a polymeric glycidyl polyether of the phenolic substance having properties and an average molecular weight depending upon the reaction conditions and the proportions of reactants employed. This is merely an example of a particular adhesive and it should be understood that various other adhesive materials, may be used.

A further embodiment of the invention, not illustrated in the drawing, comprise the utilization of a single continuous helical or convoluted plastic ribbon, or other stiff material, such as metallic foil, reinforced paper or reinforced plastics, adhesively secured to by placing panel members such that the opposing apexes of the single continuous ribbon are cemented respectively to opposing panel members. Such an arrangement often provides additional strength and rigidity where required for special applications.

Although the invention has been described with reference to particular embodiments, thereof, it is to be understood by those skilled in the art that all the modifications and alternative embodiments encompassed within the claims are intended to be included herein.

What is claimed is:

1. A laminated structure comprising a panel member having inner and outer surfaces; an adhesive coating bonded to said inner surface; a thin continuous ribbon of relatively stiff material in convoluted form secured to said adhesive coating at the apexes of the convoluted ribbon; and a cellular body member formed from a foamed-in-place synthetic resinous material which is grippingly engaged with said convoluted ribbon, thereby effecting adhesion of said body member to said outer panel.

2. A laminated structure comprising a pair of panel members oppositely disposed from one another in superposed relationship and each having an inner and outer surface; an adhesive coating bonded to at least one of said inner surfaces; a thin, continuous ribbon of relatively stiff material in convoluted form secured to said adhesive coating at the apexes of the convoluted ribbon; and a cellular body member formed from a foamed-in-place synthetic resinous material which is grippingly engaged with said convoluted ribbon to affect adhesion of the said body member to at least one of said panel members.

3. A laminated structure in accordance with claim 2 wherein the opposing apexes of said convoluted ribbon are adhesively secured respectively to the opposing inner surfaces of said panel members.

4. A laminated structure having a pair of outer panel members, said panel members each having a thin, continuous convoluted ribbon of a relatively stiff synthetic resinous material lining their internal surfaces; a layer of adhesive securing said convoluted ribbon to said internal surfaces; and an inner foamed synthetic resinous core member which is grippingly engaged to said interior surfaces by interlocking with the surfaces of said convoluted ribbons to form a unitary structure.

References Cited
UNITED STATES PATENTS

| | | | |
|---|---|---|---|
| 2,389,210 | 11/1945 | Pitman | 161—161 |
| 2,639,252 | 5/1953 | Simon et al. | 264—45 |
| 2,642,920 | 6/1953 | Simon et al. | 264—45 |
| 2,727,278 | 12/1955 | Thompson | 264—45 |
| 2,728,702 | 12/1955 | Simon et al. | 264—45 |

WILLIAM J. VAN BALEN, Primary Examiner

U.S. Cl. X.R.

161—159, 160, 161; 264—45